United States Patent
Subbarao et al.

(10) Patent No.: US 7,849,201 B1
(45) Date of Patent: Dec. 7, 2010

(54) METHOD AND SYSTEM FOR CAPTURING, ORGANIZING, SEARCHING AND SHARING WEB PAGES

(75) Inventors: Murali Subbarao, Saratoga, CA (US);
Allwyn Lobo, Campbell, CA (US);
Shankar Chittoor, Fremont, CA (US);
Rajesh Lalwani, Saratoga, CA (US)

(73) Assignee: Billeo, Inc, Santa Clara, CA (US)

( * ) Notice: Subject to any disclaimer, the term of this patent is extended or adjusted under 35 U.S.C. 154(b) by 636 days.

(21) Appl. No.: 11/451,796

(22) Filed: Jun. 13, 2006

Related U.S. Application Data

(60) Provisional application No. 60/690,769, filed on Jun. 14, 2005.

(51) Int. Cl.
*G06F 15/16* (2006.01)
(52) U.S. Cl. .................. 709/228; 709/227; 370/229
(58) Field of Classification Search .................. 709/228
See application file for complete search history.

(56) References Cited

U.S. PATENT DOCUMENTS

| | | | |
|---|---|---|---|
| 5,903,881 A * | 5/1999 | Schrader et al. ............... 705/42 |
| 7,174,318 B2 * | 2/2007 | Adelson et al. ............... 705/43 |
| 2002/0026410 A1 * | 2/2002 | Woloshin et al. ............. 705/38 |
| 2003/0135507 A1 * | 7/2003 | Hind et al. .................. 707/100 |
| 2006/0031208 A1 * | 2/2006 | Wu et al. ...................... 707/3 |
| 2008/0177994 A1 * | 7/2008 | Mayer .......................... 713/2 |

OTHER PUBLICATIONS

Keller, The Impact of Task on the Usage of Web Browser Navigation Mechanisms, 2006, Dalhousie University, pp. 8.*

* cited by examiner

*Primary Examiner*—Aaron Strange
*Assistant Examiner*—Arvin Eskandarnia
(74) *Attorney, Agent, or Firm*—William L. Botjer

(57) ABSTRACT

A system, method and computer program product has been provided for capturing, organizing, searching and sharing web page information. Web pages and user information is stored securely in a database on the network. The browser plug-in enables the user to store the information in an organized manner. The stored information can be accessed and forwarded to recipients. The system and method enables the user to store information online. The stored information can be readily accessed by the authorized user through the Internet.

8 Claims, 16 Drawing Sheets

METHOD AND SYSTEM FOR CAPTURING, ORGANIZING, SEARCHING AND SHARING WEB PAGES

RELATED APPLICATIONS

This application claims priority of U.S. Provisional Patent Application Ser. No. 60/690,769 entitled "Method and system for organizing for capturing, organizing, searching and sharing web pages", filed on Jun. 14, 2005, which is incorporated by reference as if set forth herein in its entirety.

BACKGROUND OF THE INVENTION

1. Field of the Invention

The present invention relates generally to information management, and more particularly to a method and system for capturing, organizing, searching and sharing information included in web pages.

2. Description of the Related Art

Recent developments enable online payment facilities over the Internet. A user can carry out various transactions ranging from online bill payments and purchases to online reservations. While conducting these activities, the user browses through a large number of web pages and may like to record some of them. These pages could be in the form of transaction-confirmation notifications, electronic statements or bills, or any other web page that is of interest to the user. These web pages can be recorded and saved in the memory of the computing device.

Conventional methods for saving web pages included saving the web page on the hard disk of a user's computing device. However, the hard disk may not be accessible from a remote location. Therefore, the user is deprived of using the stored information and is forced to search for the required information again. In addition, the information stored on the hard disk requires a name, for easy accessibility by the user. Moreover, if the number of web pages stored on the hard disk is large, the memory space they occupy on the hard disk is also more. It is also difficult to organize and manage this large amount of information. Moreover, there is the danger of the information stored on the hard disk being accessed by any unauthorized person.

In a conventional method, a credit card provider company allows a user, who is a credit card holder, to store the transaction details of an online transaction. Transaction details, which include transaction confirmation notifications and electronic statements, are available online on the credit card provider's website and can be accessed by the user via the Internet. However, the credit card provider allows the user to store and view the transaction details pertaining to this particular credit card of the user. If the user has two credit cards of two different credit card providers, then the user cannot access the stored transaction details of these credit cards in a single website.

In light of the above discussion, there is a need for a method and a system that would enable the user to capture, organize, search and share a variety of web pages such as statements, bills, payment confirmation, news articles, and so forth. Moreover, the system should allow the user to access the stored web pages from remote locations. The system should also allow the user to forward web pages to friends and associates. The system should further, be able to protect web pages from unauthorized access and should store the web pages in a secure manner.

SUMMARY

An object of the invention is to provide a user with a browser plug-in inside the user's web browser, where the browser plug-in assists in organizing, searching and sharing web pages such as statements, bills, payment confirmations, news articles, and so forth.

Another object of the invention is to provide a method and a system for saving web pages in a central repository that is connected with the Internet, which enables a user to access the stored web pages at any time.

Still another object of the invention is to provide a method and a system that stores the web pages in a secure manner and protects the stored web pages from unauthorized access.

Another objective of the invention is to automatically store the web page based on preference settings.

Another objective of the invention is to automatically capture information on the web page pertaining to a payment transaction.

Yet another objective of the invention is to index the text of the stored web pages to enable users to search the stored web pages.

Another objective of the invention is to link the stored web page with other information in the central repository.

Another objective of the invention is to "time-stamp" the stored web page from a certified authority.

Various embodiments of the present invention provide a system for capturing, organizing, searching and sharing information provided in the web pages. The system includes a central repository for storing information provided in the web pages. The system further includes a browser plug-in installed on the computing device of a user. The system also includes an application that acts as a communication interface between the browser plug-in and the central repository.

Various embodiments of the present invention provide a method for capturing, organizing, searching and sharing information provided in the web pages. The method provides a browser plug-in to a user that enables the user to store web page/s. Further, the user provides attributes of the web page while storing it and saves the web page along with the information in the central repository. Further, the browser plug-in captures the information from the web page while storing it. The central repository maintains the web page securely along with the attributes provided by the user. The method further includes displaying the stored web pages on a portal that enables the user to access the stored web pages. The method also includes the option of forwarding these web pages stored in the central repository.

BRIEF DESCRIPTION OF THE DRAWINGS

Various embodiments of the invention will hereinafter be described in conjunction with the appended drawings provided to illustrate and not to limit the invention, wherein like designations denote like elements, and in which:

FIG. 14 is a view of the display when a user views the shared web page in MS Outlook™, in accordance with an embodiment of the invention;

FIG. 16 is a view of the display when a user makes a selection to store and forward a web page, in accordance with an embodiment of the invention.

DESCRIPTION OF VARIOUS EMBODIMENTS

Various embodiments of the invention provide a method, system and a computer program for capturing, organizing, searching and sharing web page information. This is achieved by creating a user account whereby, a user can store information in a central repository (database). The information includes user input and web pages that are stored in an organized and secure manner in the central repository. The stored information can be viewed, edited, searched, linked, time-stamped, updated, and forwarded to a recipient.

Figure 1:
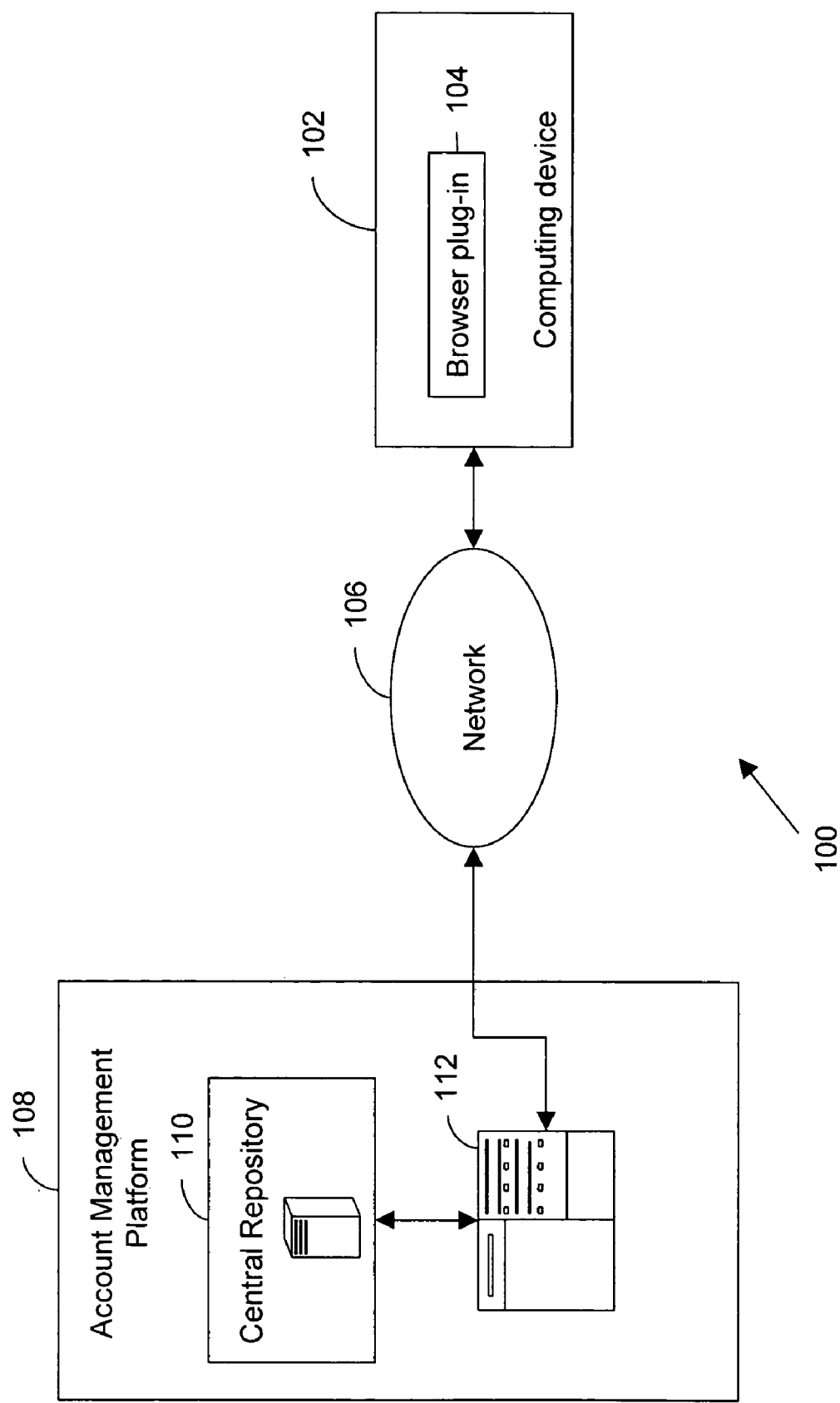
FIG. 1 is a block diagram of an exemplary operational environment, where various embodiments of the present invention can be practiced.

FIG. 1 is a block diagram of an exemplary operational environment 100, where various embodiments of the invention can be practiced. Operational environment 100 includes one or more computing devices 102, a browser plug-in 104 installed on the one or more computing device 102, a network 106, and an Account Management Platform (AMP) 108. AMP 108 includes a central repository 110 and an application 112. Central repository 110 and application 112 are connected. In an embodiment of the invention; AMP 108 is a group of interconnected computing devices that function as a single computing device. The group of interconnected computing devices functioning as a single computing device is known as a cluster.

Computing device 102 can access application 112 via network 106. Computing device 102 can be a personal computer, a laptop, a personal digital assistant (PDA), and so forth. Browser plug-in 104 can be software, hardware, or a combination thereof. In an embodiment of the invention, browser plug-in 104 includes a Graphical User Interface (GUI), and software installed on computing device 102. Browser plug-in 104 displays the GUI component inside the browser of computing device 102. An exemplary browser is the Microsoft Internet Explorer™. However, the invention is not limited to the use of Microsoft Internet Explorer only. Other browsers such as Netscape Navigator™, Mozilla™, FireFox™, Safari™, or any other browser can also be used. The GUI component of Browser plug-in 104 provides the user with interactive graphical images. The actions performed, using graphical images provided by GUI, give commands to the software of browser plug-in 104. For example, the user can click a button in the GUI to view a web page. On clicking a button, the browser plug-in software of browser plug-in 104 will interact with AMP 108 to extract the required information from central repository 110 and display the web page to the user inside the browser.

The GUI of browser plug-in 104 is displayed each time a web browser is launched by the user on computing device 102. According to an embodiment of the invention, the GUI is displayed and browser plug-in 104. Browser plug-in 104 communicates with AMP 108 through network 106. The GUI of Browser plug-in is described in detail in conjunction with FIG. 4.

In an embodiment of the invention, browser plug-in 104 can be created by using C++. However, other programming languages such as Visual Basic, C#, Java or any other language can also be used.

According to an embodiment of the invention, the user can download browser plug-in 104 from a website hosted by AMP 108 or another website on the Internet. For example, the website can be a biller's website for specifying payments to be made by the user. Billers include utility billers such as electricity, water, banks and so forth. Examples of payments made through billers include electricity bill, credit card bill, shopping bill, telephone bill, health insurance premium, general insurance premium, online trading, bank payment, reservations, among others. The biller provides browser plug-in 104 to all its customers in the biller's website. In another embodiment of the invention, the user can purchase browser plug-in 104 from a service provider in the form of a computer program product, such as an USB key chain drive, a CD ROM, a memory stick, and so forth. In yet another embodiment the user can view and access browser plug-in 104 on a computing device 102 where the browser plug-in 104 is already present.

In an embodiment of the invention, network 106 can be the Internet, a local area network (LAN), a wide area network (WAN), or any other type of fixed line or wireless communication network. Central repository 110 stores and organizes information related to multiple users and various websites. More specifically, central repository 110 contains information related to a variety of billers and their websites. In addition, central repository 110 contains information pertaining to the profile of the user. In an embodiment of the invention, the profile of the user includes authentication information about the user, a list of billers with whom the user transacts, information related to payment methods employed by the user, and other such information. Application 112 provides an interface for communication between AMP 108 and computing device 102. Central repository 110 and application 112 are explained in detail in conjunction with FIGS. 2 and 3, respectively.

Figure 2:
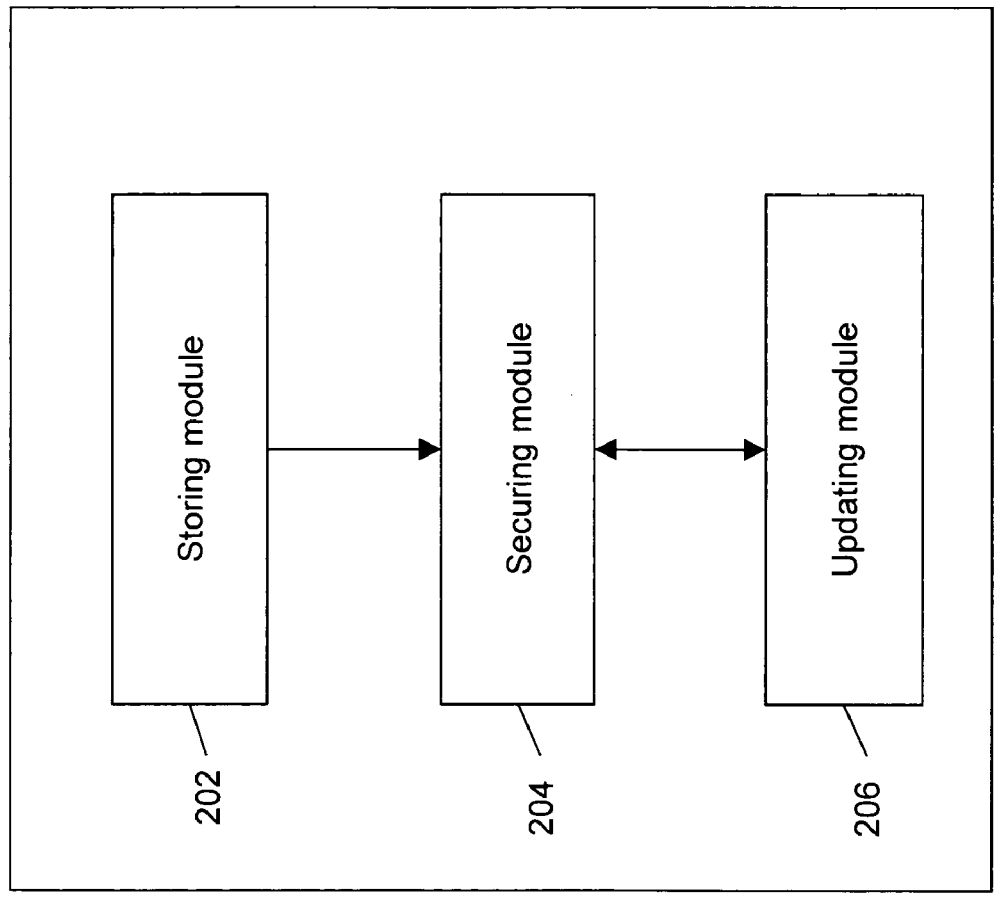
FIG. 2 is a block diagram of a central repository, in accordance with an embodiment of the invention.

FIG. 2 is a block diagram of central repository 110, in accordance with an embodiment of the invention. Central repository 110 includes a storing module 202 for storing information. In an embodiment of the invention, information stored by storing module 202 includes a profile of the user. In an embodiment of the invention, the profile of the user includes information for authenticating the user to access AMP 108 through browser plug-in 104. The authentication information can be in the form of a user name and a password that is provided by the user at the time of creating an account in AMP 108. Central repository 110 also contains information pertaining to web pages stored by the user. In an embodiment of the invention, central repository 110 is the cluster.

In another embodiment of the invention, the profile of the user includes information related to payment methods that can be used by the user to carry out online payments. For example, the user can have one or more credit card accounts or bank accounts.

The user can store web pages by clicking an appropriate button or graphical image in the GUI component of browser plug-in 104. In an embodiment of the invention the user instructs browser plug-in 104 to automatically store web pages based on preference settings. The preference settings are specified by the user in browser plug-in 104. For instance, web pages for payment confirmation on a biller website are stored automatically while the user views the web page. In an embodiment of the invention, the preference settings may specify to save payment confirmation on a specific biller site, a select list of biller sites, or on any web site including an ecommerce web site such as Amazon.com.

In an embodiment of the invention, central repository 110 stores other information available on a web page. For example, a confirmation received by the user after a payment has been made on the biller's website is stored in central repository 110. In an embodiment of the invention, central repository 110 stores information relating to the billers selected by the user on creating an account. The selected billers are referred to as the accounts of the user. Further, central repository 110 stores and updates information related to a category of a stored web page. For example, the websites may be categorized as telephone, utility, mortgage, credit card, among others. The category helps the user to search the stored web pages in an organized manner. In an embodiment of the invention the web pages can be searched based on payment method, payment amount or date of payment.

Central repository 110 uses the information provided by the user to organize the stored web pages and facilitate the process of searching for the web pages in future.

Further, central repository 110 includes a securing module 204 that secures the web pages while storing. In an embodiment of the invention the information is encrypted and stored to provide protection from unauthorized access. In an embodiment of the invention, central repository 110 includes an updating module 206 for updating, modifying or deleting stored information by the user. In an embodiment of the invention, the data in the central repository 110 is updated, modified or deleted manually by editors at AMP 108. Editors are persons who can interact with the central repository 108 through a computing device. The data may also be updated, modified or deleted by billers listed in central repository 110. The editors and the billers have information such as the e-mail addresses and zip codes of the users, to ensure security of user information and avoid unauthorized access.

Figure 3:
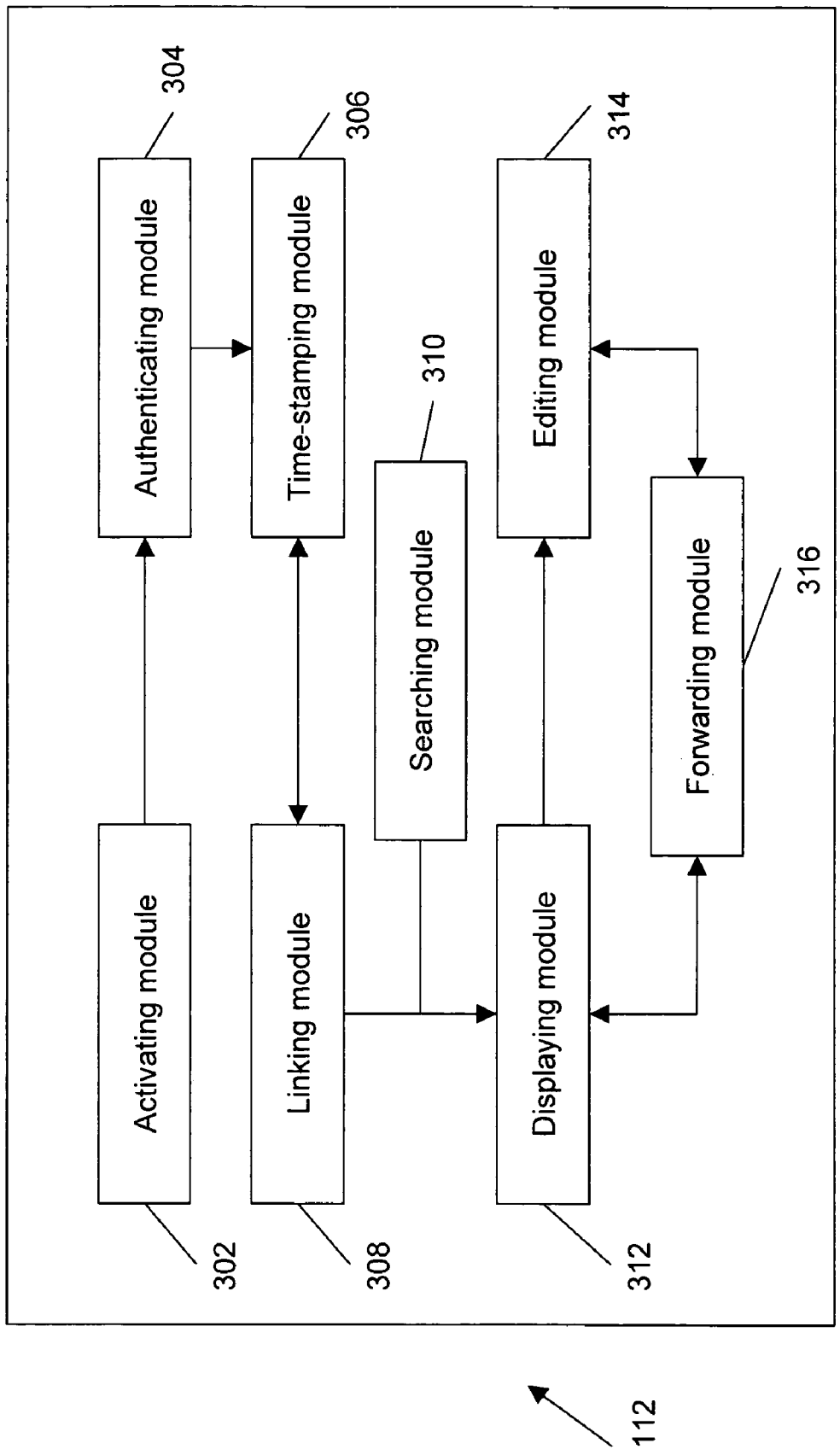
FIG. 3 is a block diagram of an application, in accordance with an embodiment of the invention.

FIG. 3 is a block diagram of application 112, in accordance with an embodiment of the invention. Application 112 includes activating module 302, authenticating module 304, time-stamping module 306, linking module 308, searching module 310, displaying module 312, editing module 314, and a forwarding module 316. Application 112 provides a web-based interface, which enables the user to communicate with AMP 108. Programs residing in application 112 provide the user with the services. In an embodiment of the invention, the user communicates with AMP 108 to search, view, add, modify, or delete information pertaining to the profile of the user or the web pages stored by the user in central repository 110.

Activating module 302 activates the browser plug-in 104. In an embodiment of the invention, browser plug-in is available and activated whenever browser is open. It enables the user to access the account and information stored in the account. It allows the user to store, search, organize, and update the information included in the web pages. In an embodiment of the invention, browser plug-in 104 is activated automatically based on preference selected by the user.

Authenticating module 304 validates the authentication information each time the user inputs authentication information to browser plug-in 104. Validation is performed by comparing the profile of the user stored in central repository 110 with the authentication information input by the user. The user is considered to be authentic if the authentication information input by the user matches the profile stored in central repository 110. Application 112 activates browser plug-in 104 for an authenticated user. In an embodiment of the invention, the user profile also specifies the web pages stored by the user. In an embodiment of the invention, the authentication is done automatically when a user selects a preference.

Time-stamping module 306 stores time of storing the web page automatically in central repository 110 along with the web pages.

Linking module 308 links the stored web pages with other related information in central repository 110. For example, the other related information includes web pages from same URL, web pages with same payment method, web pages with same category, and so forth.

Searching module 310 enables the user to search desired, web pages in central repository 110. For example, the user can search for all payments made in a particular month or having same biller.

Displaying module 312 displays a list of web pages stored by the user on a portal on computing device 102 when requested by the user. Displaying module 306 enables an authenticated user to access the stored web pages. A list of the stored web pages is displayed and the user selects a web page from the list:

Editing module 314 enables the user to edit the account information for the user such as users' password and account information, the attributes of a stored web page, adding or deleting billers of interest.

Forwarding module 316 enables the user to forward the stored web pages to friends and associates. In another embodiment of the invention, forwarding module 310 provides the user with an option to enter a message that accompanies the stored web page while forwarding the stored web page. In an embodiment of the invention, the message accompanying the stored web page includes information to be sent to a recipient.

Figure 4:
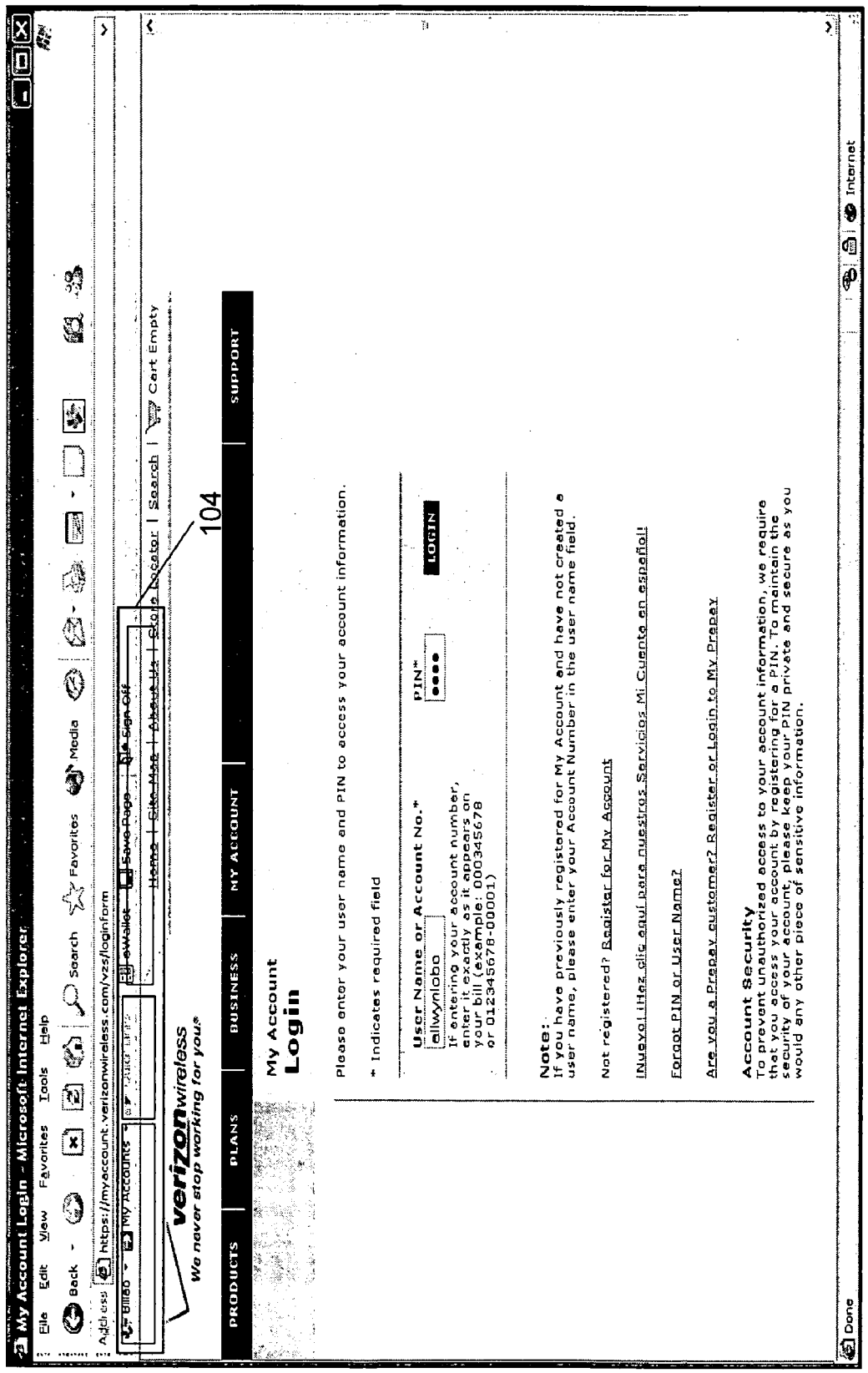
FIG. 4 illustrates the display of browser plug-in 104 on a web page, in accordance with an embodiment of the invention.

FIG. 4 illustrates the display of browser plug-in 104 on a web page, in accordance with an embodiment of the invention. Browser plug-in 104 can be seen on top of the web site, below the address toolbar, and inside the browser window. Browser plug-in 104 consists of standard buttons: "My Accounts", "eWallet", "Save Page", "Quick links" and "Sign Off".

In one embodiment of the invention, the 'My Accounts' standard button of browser plug-in 104 provides a list of user accounts on various websites. For example, the user may create an account for paying bills of mobile phone, credit card and the like. The 'eWallet' standard button of browser plug-in 104 provides automated filling of forms on web sites. The forms may require information that includes standard information such as name, address, credit card number and other details of the user. The 'Save Page' standard button of browser plug-in 104 saves the displayed web page on the computer of the user. In an embodiment of the invention the 'Save Page' standard button provides the user with settings for saving the web page manually and automatically. The 'Sign Off' standard button of browser plug-in 104 facilitates logging out of a secure account on a web site. In one embodiment of the invention, the 'Quick Link' button provides links to the information relevant to the user from a web site.

Figure 5:
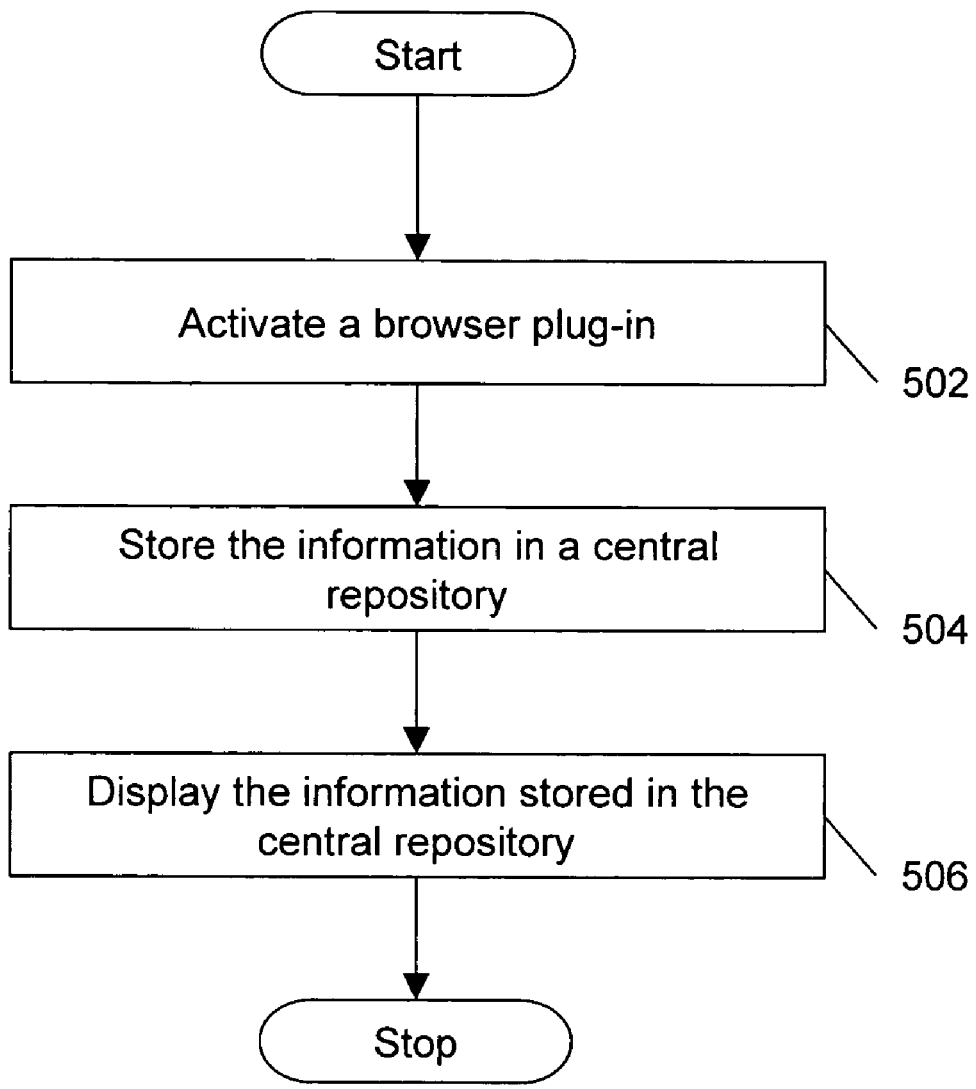
FIG. 5 is a flowchart of a method for capturing, organizing, searching and sharing information, in accordance with an embodiment of the invention.

FIG. 5 is a flowchart of a method for capturing, organizing, searching and sharing information, in accordance with an embodiment of the invention. A web page is displayed on the web browser. Browser plug-in 104 is installed on the web browser. Thereafter, at step 502, browser plug-in 104 is activated to store the web page displayed on the web browser. Browser plug-in 104 is activated by logging into the user's account. At step 504, the user stores the information in central repository 110. As a result, a window is displayed to the user. The window contains various buttons that define an action to store the web page, to cancel the displayed window and ask for help. An exemplary window for storing the web page is further explained in conjunction with FIG. 10. Subsequently, at step 506; a list of stored web pages is displayed on the portal for viewing, editing, updating, deleting, and forwarding the stored web pages.

Figure 6:
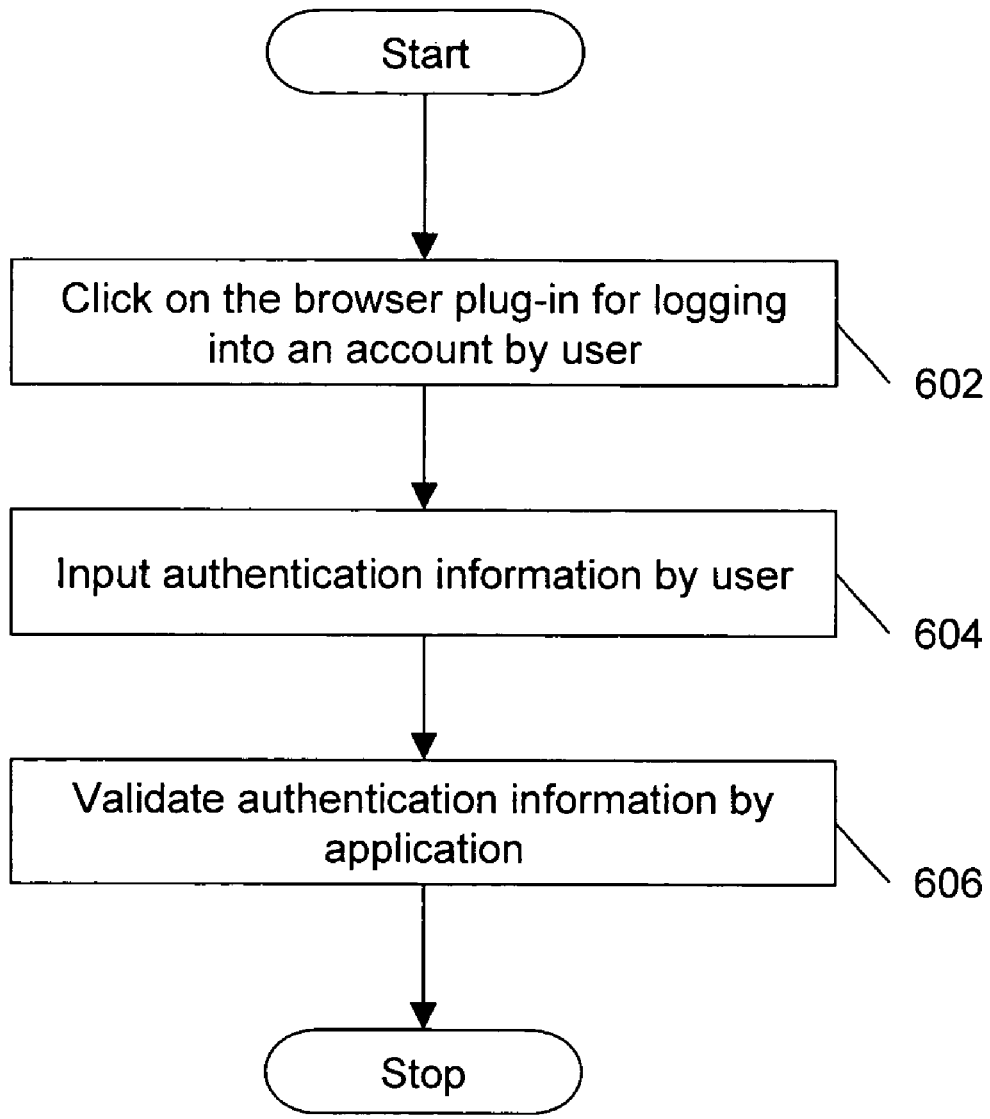
FIG. 6 is a flowchart of a method for activating a browser plug-in to access an account, in accordance with an embodiment of the invention.

FIG. 6 is a flowchart of a method for activating browser plug-in 104 to access an account, in accordance with an embodiment of the invention. Browser plug-in 104 is present on the web browser. At step 602, the user clicks on browser plug-in 104 button for logging into the account. The user is required to log into the account for viewing, editing, and forwarding the stored information in central repository 110. Thereafter, a window for logging into the account is displayed. The window requires inputs from the user. Further, at step 604, the user inputs the authentication information in the window. In an embodiment of the invention, the user can be authenticated by a simple username-password authentication system. Thereafter, at step 606, the authentication information of the user is validated by application 112 and browser plug-in 104 is activated. After activating browser plug-in 104, the user is able to perform various actions by clicking on icons of browser plug-in 104. In an embodiment of the invention, various actions include storing, updating, modifying, deleting, adding, viewing, editing and forwarding information stored in central repository 110.

Figure 7:
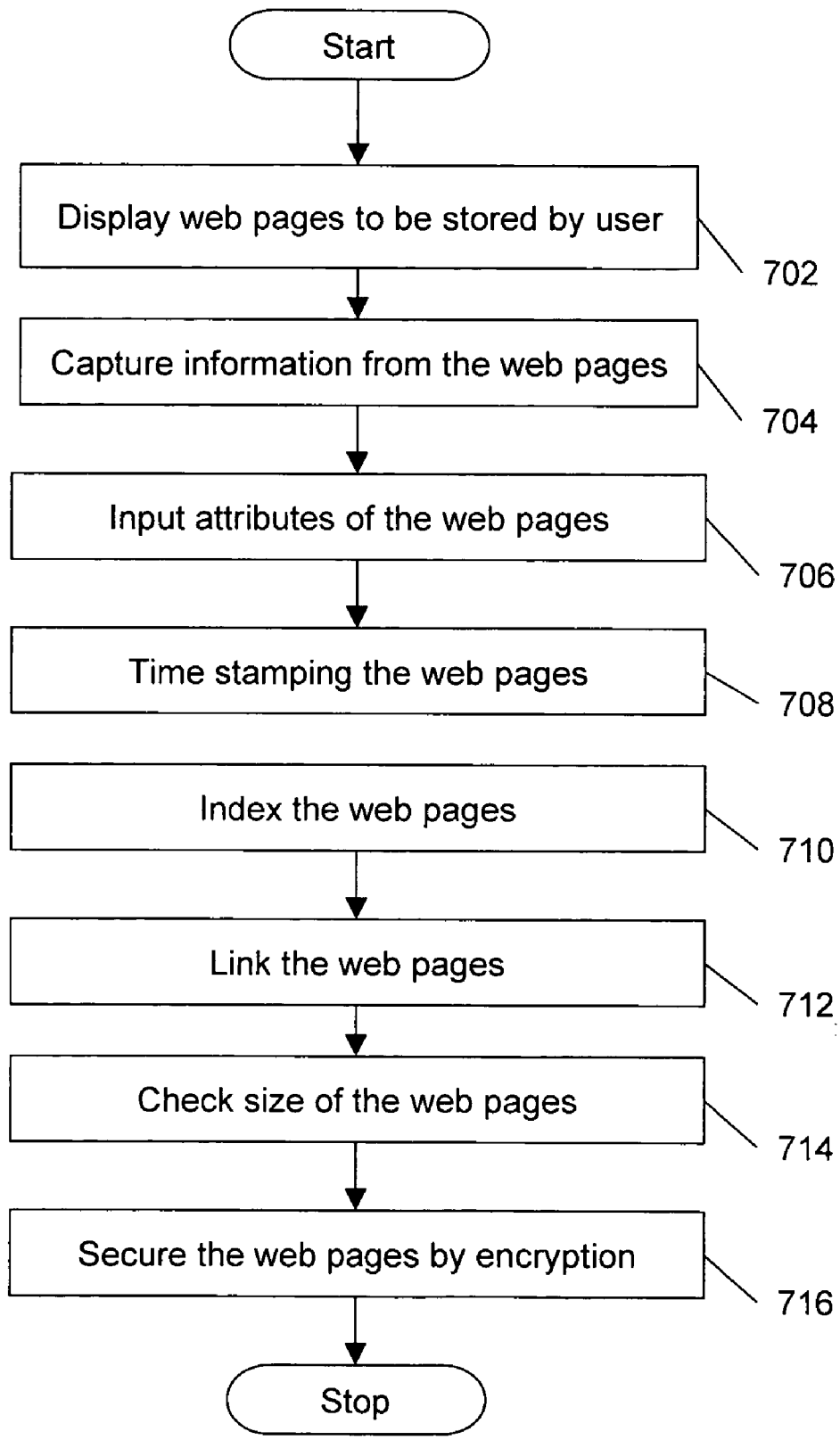
FIG. 7 is a flowchart of a method for storing information, which is included in web pages, in accordance with an embodiment of the invention.

FIG. 7 is a flowchart of a method for storing information included in the web pages, in accordance with an embodiment of the invention. At step 702, a web page to be stored for future reference is displayed on the web browser. The user then clicks on browser plug-in 104 for storing the web page. Subsequently, a window for storing the web page is displayed. Thereafter, at step 704, browser plug-in 104 captures information from the web page selected by the user for storing. In an embodiment of the invention, all the visible content of the web pages is captured while storing the web page. In an embodiment of the invention, the information captured from the web page includes attributes such as the date on which the web page is stored, type of web page, account category, payment method, payment amount, the identity of the page and the universal resource locator (URL), to enable the user to categorize the stored web pages. The information entered by the user using the window is also captured. In an embodiment of the invention, initiating capture of web page information is performed automatically based on the preference settings.

Additionally, billing information such as the total amount due, the minimum amount due, and the due date is also captured. In an embodiment of the invention, the billing information is captured from the selected web page. In another embodiment of the invention, the billing information is captured from information entered by the user during registration. In yet another embodiment of the invention, the billing information can be input by the user.

At step 706, the user inputs the attributes of the web page in the window displayed while storing the web page. In an embodiment of the invention, the user input attributes such as naming the web page, selecting an account, a category of the web page, and so forth. In an embodiment of the invention, the user selects an account from a list of billers that the user has provided during the registration process. Additionally, the user can add new billers and categories while storing the web page. Browser plug-in 104 retrieves data from central repository 110, to provide the user with options of selecting the type of page, for example, bill, payment confirmation, electronic statement, news article, and so forth. Further, the window offers the user an option to provide attributes about the selected web page. In an embodiment of the invention, the information captured automatically can be corrected by the user.

When the user selects pages to store them by using the GUI of browser plug-in 104, the window for storing web page is displayed and the information entered by the user is captured by browser plug-in 104. Browser plug-in 104 now sends the information to AMP 108, where the information is stored in central repository 110. At step, 708 time-stamping module 306 stores time of storing the web page automatically in central repository 110 along with the web pages.

At step 710, the text of the stored web pages is indexed for searching. Indexing refers to the creation of vocabulary from keywords in the text of the stored web pages that can subsequently be searched and viewed using keywords from the vocabulary. In an embodiment of the invention, the web pages are categorized to enable the user to search the web page. In an embodiment of the invention, the stored web pages are automatically categorized, based on the URL of the web page. In another embodiment of the invention, the stored web pages are categorized on the basis of the category selected by the user while storing the web page. Categorization enables the user to sort and view web pages of a desired category. Web pages can be sorted using one of the parameters such as the date on which the web page was stored, account name, type of page, etc. In an embodiment of the invention, when the user makes a selection to view the stored web page from the sorted list, the stored web page appears in a new window. At step 712, the web pages to be stored are linked to the other related web pages stored in central repository 110.

At step 714, the size of the web page is checked. In case the web page is larger than the screen size, the web page is converted to an appropriate format for storing the entire page. For example, if a web page is larger than the screen size, browser plug-in 104 scrolls through the entire web page and converts it into a suitable format such as JPG, GIF, TIFF, PDF, and so forth. Additionally, the user is given the option of controlling the quality of the stored page. The quality of web page includes screen size, format or weight of the web page. The quality selected by the user affects the compression and the final size and space of the file stored in central repository 110.

Thereafter, at step 716, the web page to be stored in central repository 110 is encrypted to avoid unauthorized access. In an embodiment of the invention, the stored web pages are encrypted using Advanced Encryption Standard (AES). In an embodiment of the invention, a 128-bit encryption is used for encrypting the web pages.

Figure 8:
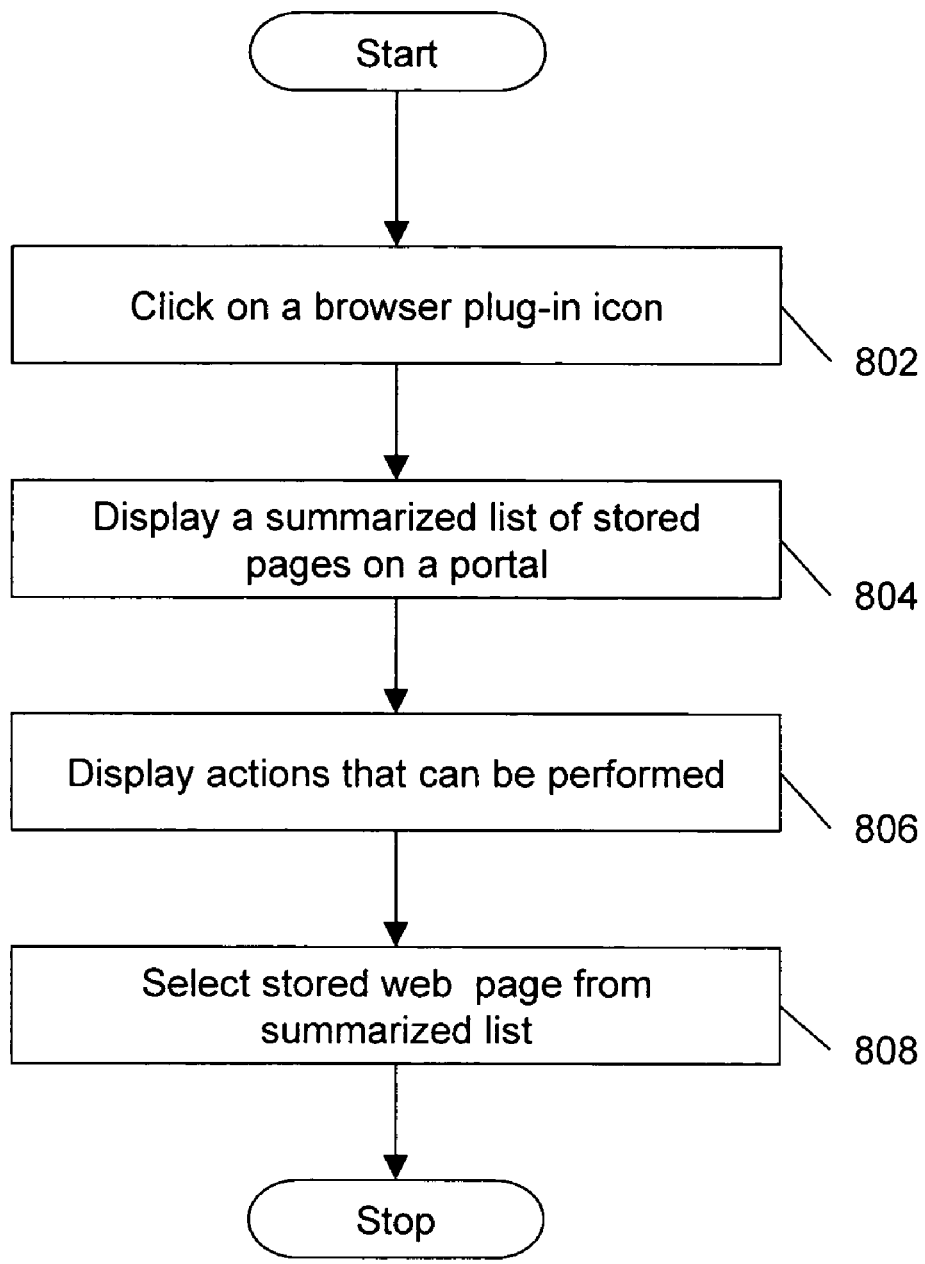
FIG. 8 is a flowchart for displaying a summarized list of stored web pages, in accordance with an embodiment of the invention.

FIG. 8 is a flowchart for displaying a summarized list of stored web pages, in accordance with an embodiment of the invention. At step 802, the user clicks on an icon on browser plug-in 104 for displaying the stored web pages. Subsequently, at step 804, the stored pages are displayed as a list of the stored web pages.

In an embodiment of the invention, the list is a summary including information pertaining to each stored web page, such as the date of storing the web page, account name of the user, type of web page, attributes provided by the user while storing, and such information. At step 806, the list displays actions that can be performed on the stored web pages. In an embodiment of the invention, the actions include viewing, forwarding, and editing information entered while storing the web page. An exemplary page that displays the summary of the information related to the stored web pages is further explained in conjunction with FIG. 11. At step 808, a web page to be viewed is selected from the list by the user. Thereafter, the web page selected by the user is displayed in a separate window. An exemplary action of viewing the stored web page is further explained in conjunction with FIG. 12.

In an embodiment of the invention, the web pages stored in central repository 110 in the encrypted format are decrypted and displayed when the user accesses the stored web pages.

Figure 9:
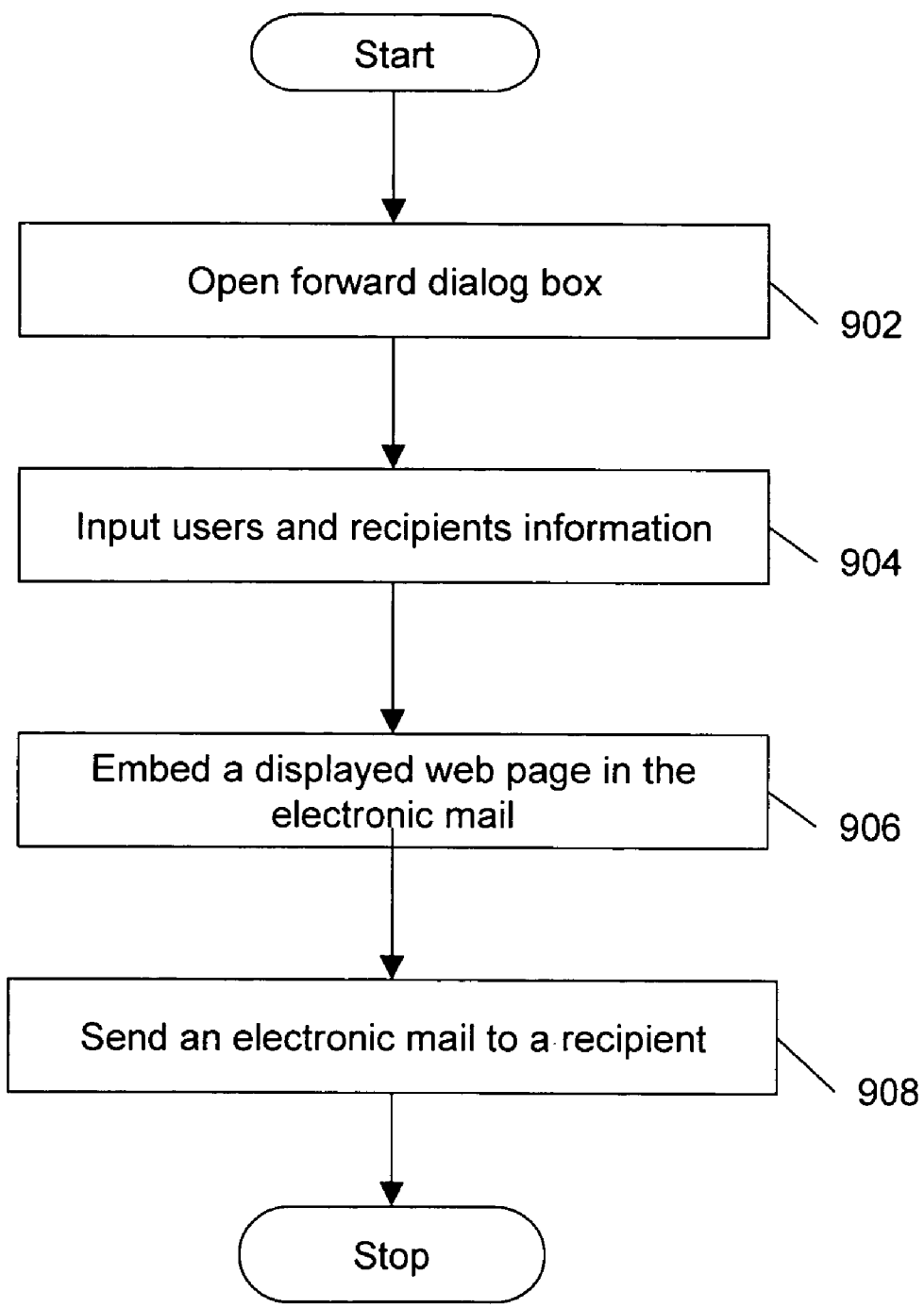
FIG. 9 is a flowchart for forwarding a stored web page to a recipient, in accordance with an embodiment of the invention.

FIG. 9 is a flowchart for forwarding a stored web page to a recipient, in accordance with an embodiment of the invention. The user selects a stored web page to be forwarded to a recipient. At step 902, a window is displayed with options for forwarding a selected web page. In an embodiment of the invention, there are options to input information related to users and recipients. At step 904, the user inputs the information for forwarding the selected web page. In an embodiment of the invention, the input information includes user name and e-mail address and recipient's name and e-mail address.

In an embodiment of the invention, the user can enter a message for the recipient accompanying the selected web page to be forwarded. Further, the window also enables the user to receive a copy of the forwarded web page and the message. An exemplary action of forwarding the stored web page is further explained in conjunction with FIG. 13

Figure 14:
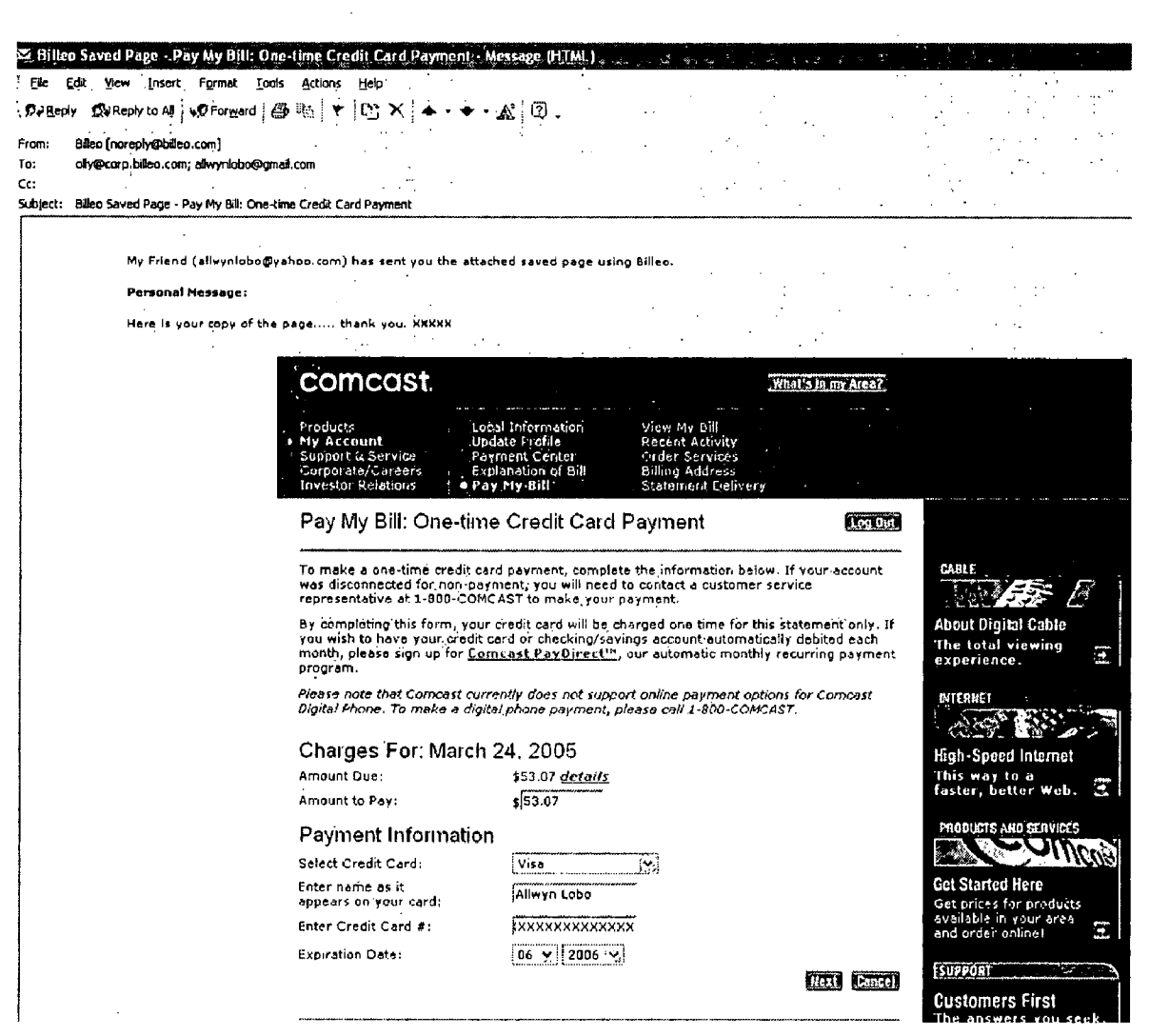
Figure 15:
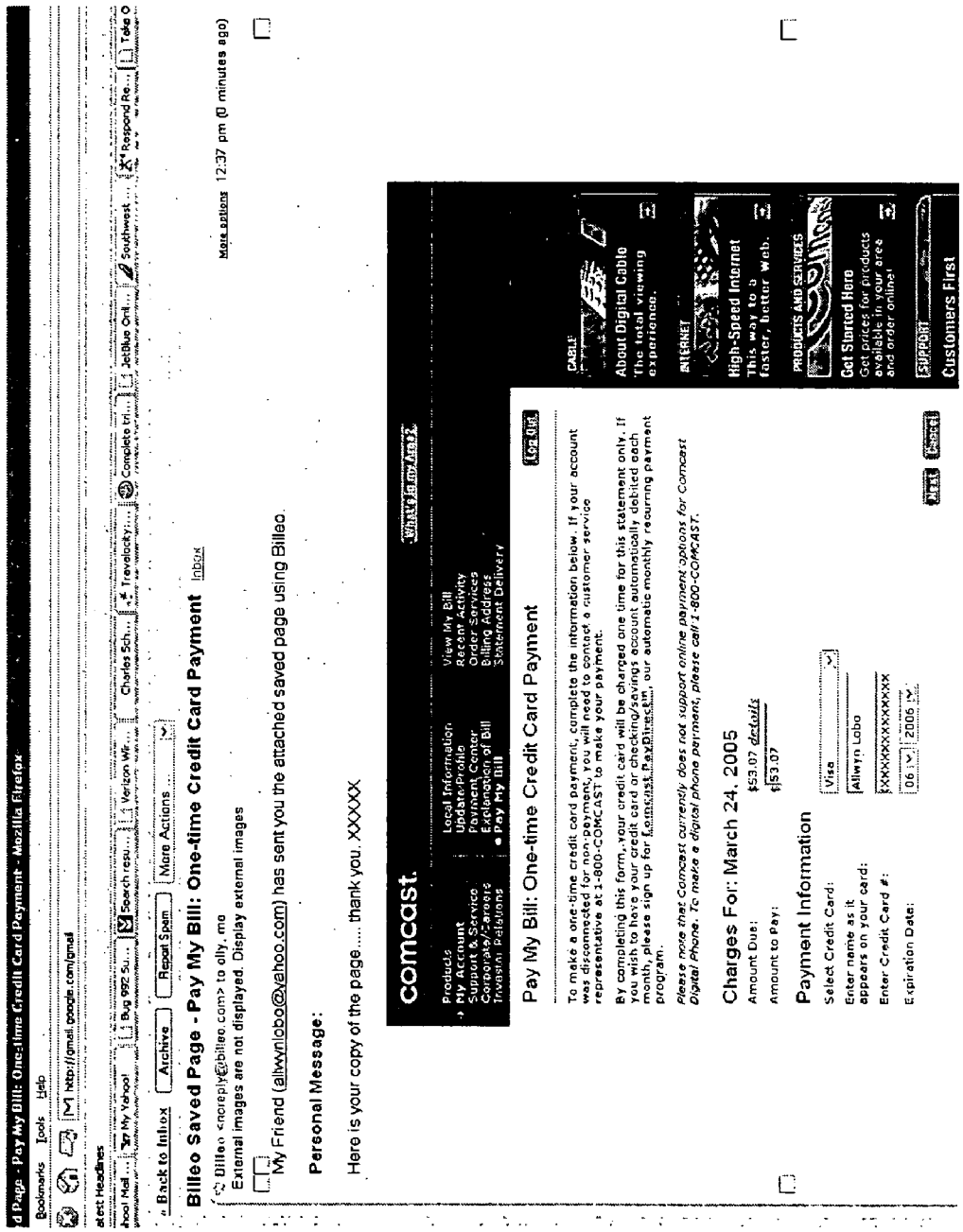
FIG. 15 is a view of the display when a user views the shared web page in Gmail™, in accordance with an embodiment of the invention.

Thereafter, at step 906, the selected web page is embedded in an electronic mail in a format selected by the user. In an embodiment of the invention, the format selected by the user is an HTML format. In an embodiment of the invention, the stored web page is forwarded as an attachment to an electronic mail. An exemplary page, displaying the forwarded stored web page in MS Outlook™, is shown in FIG. 14. Further, an exemplary page displaying the forwarded stored web page in Gmail™ is shown in FIG. 15. Subsequently, at step 908, the web page is sent to a recipient through an electronic mail.

In an embodiment of the invention, the user can store and forward a displayed web page simultaneously by clicking on a 'save & forward' button on browser plug-in 104. When the user makes a selection to store and forward a web page, a window appears. In an embodiment of the invention, the window has four action buttons that the user can choose from. These actions are: save, cancel, help, and save & forward. In an embodiment of the invention, the option of simultaneously saving and forwarding enables the user to provide the user name and an e-mail address, a recipient's e-mail address, and a message for the recipient. This information is used to send the stored web page to the mentioned recipient. The web page is sent from the e-mail address of the user. An exemplary page displaying the window of the store & forward dialog box is further explained in conjunction with FIG. 16.

Figure 10:
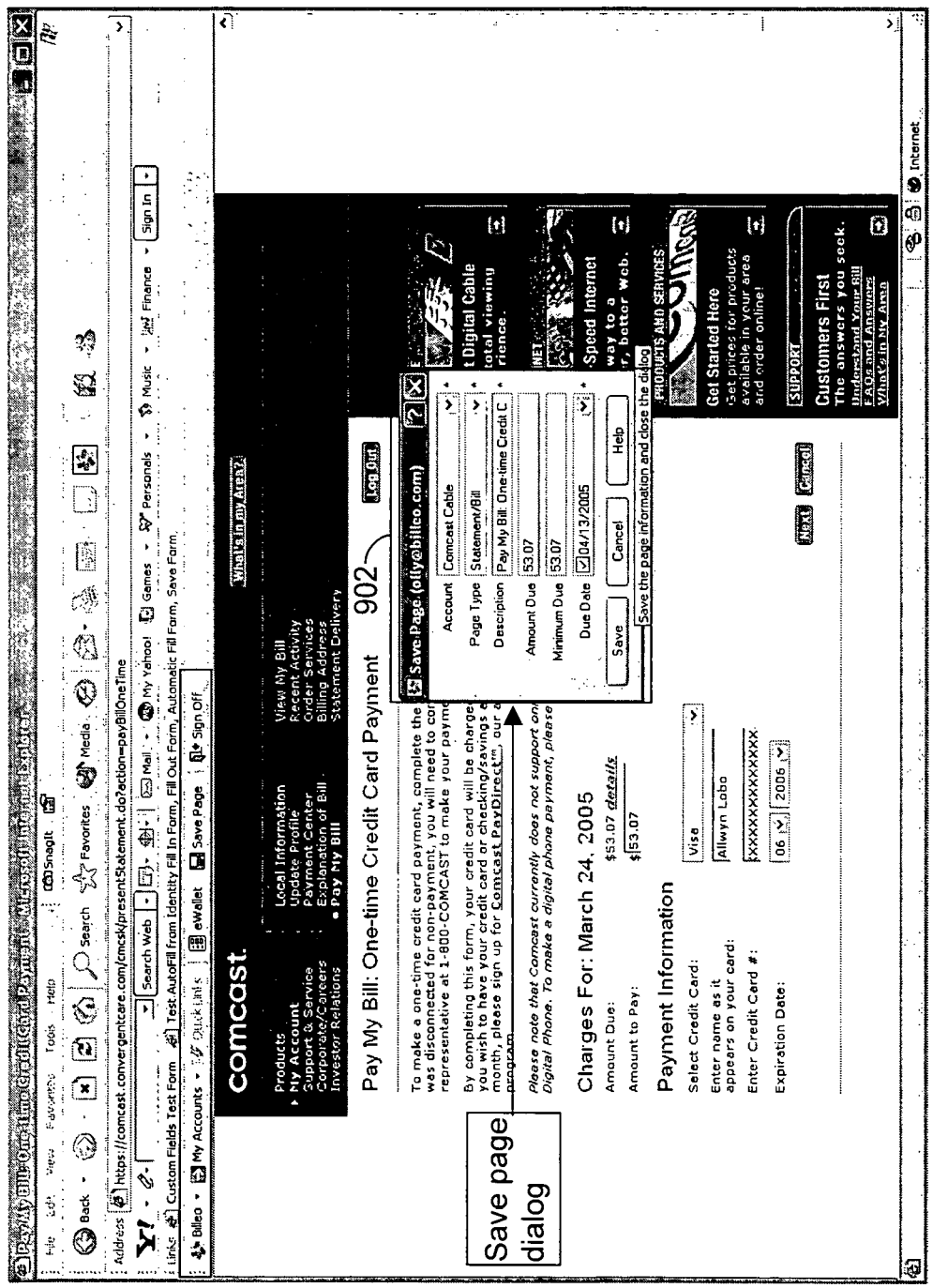
FIG. 10 is a view of the display when a user makes a selection to store a web page, in accordance with an embodiment of the invention.

FIG. 10 is a view of the display when a user makes a selection to store a web page, in accordance with an embodiment of the invention. The view shows a bill and the payment details given by the user. Window 1002 gives options for storing the web pages.

Figure 11:
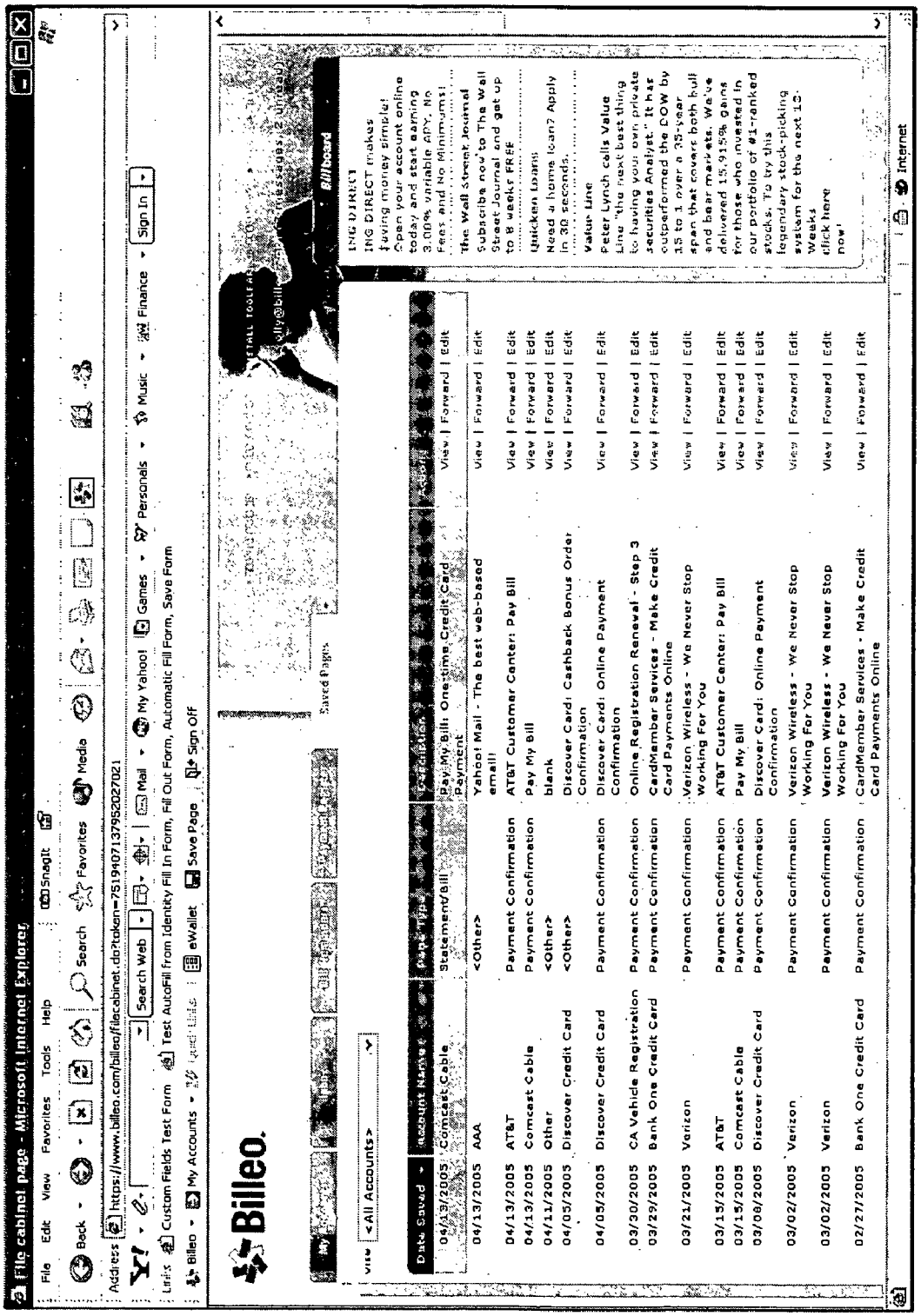
FIG. 11 is a view of the display when a user accesses a portal to view the stored web pages, in accordance with an embodiment of the invention.

FIG. 11 is a view of the display when the user accesses a portal to view stored web pages, in accordance with an embodiment of the invention. The figure shows a summarized list of stored web pages that include details of date, account name, attributes and actions that can be performed on the stored web pages. The actions that can be performed include viewing, forwarding and editing the stored web pages. The user clicks on one of the actions to be performed. The stored web pages are decrypted to enable the user to view them.

Figure 12:
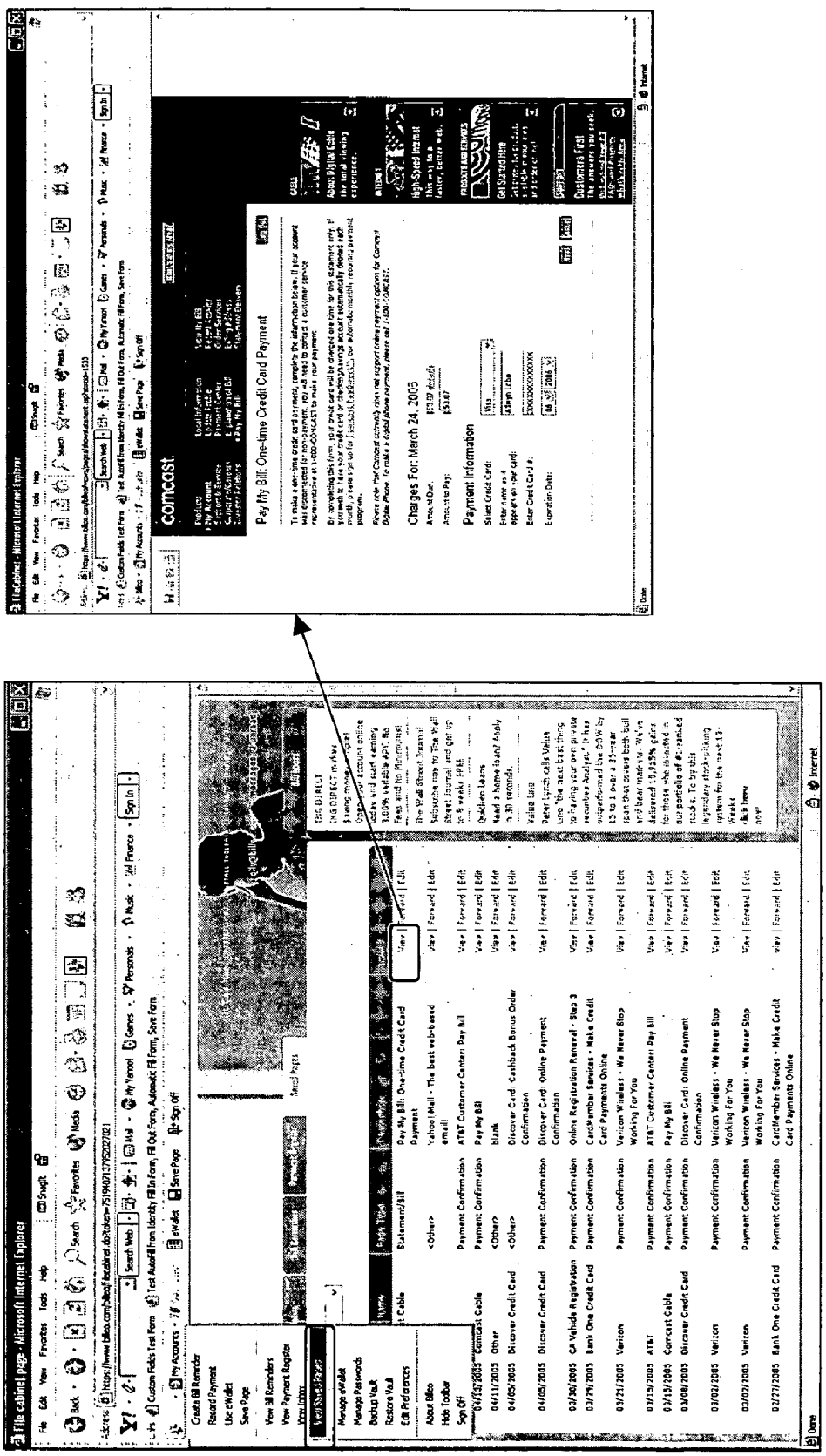
FIG. 12 is a view of the display when a user makes a selection to view a stored web page, in accordance with an embodiment of the invention.

FIG. 12 is a view of the display when the user makes a selection to view a stored web page, in accordance with an embodiment of the invention. When the user clicks on the 'view' link provided in the summarized list, the corresponding stored web page is displayed. For example, the figure shows that when a user clicks to view the page with attribute 'Pay My Bill: One-Time Credit Card Payment', the stored page opens and is displayed in a new window, in accordance with an embodiment of the invention.

Figure 13:
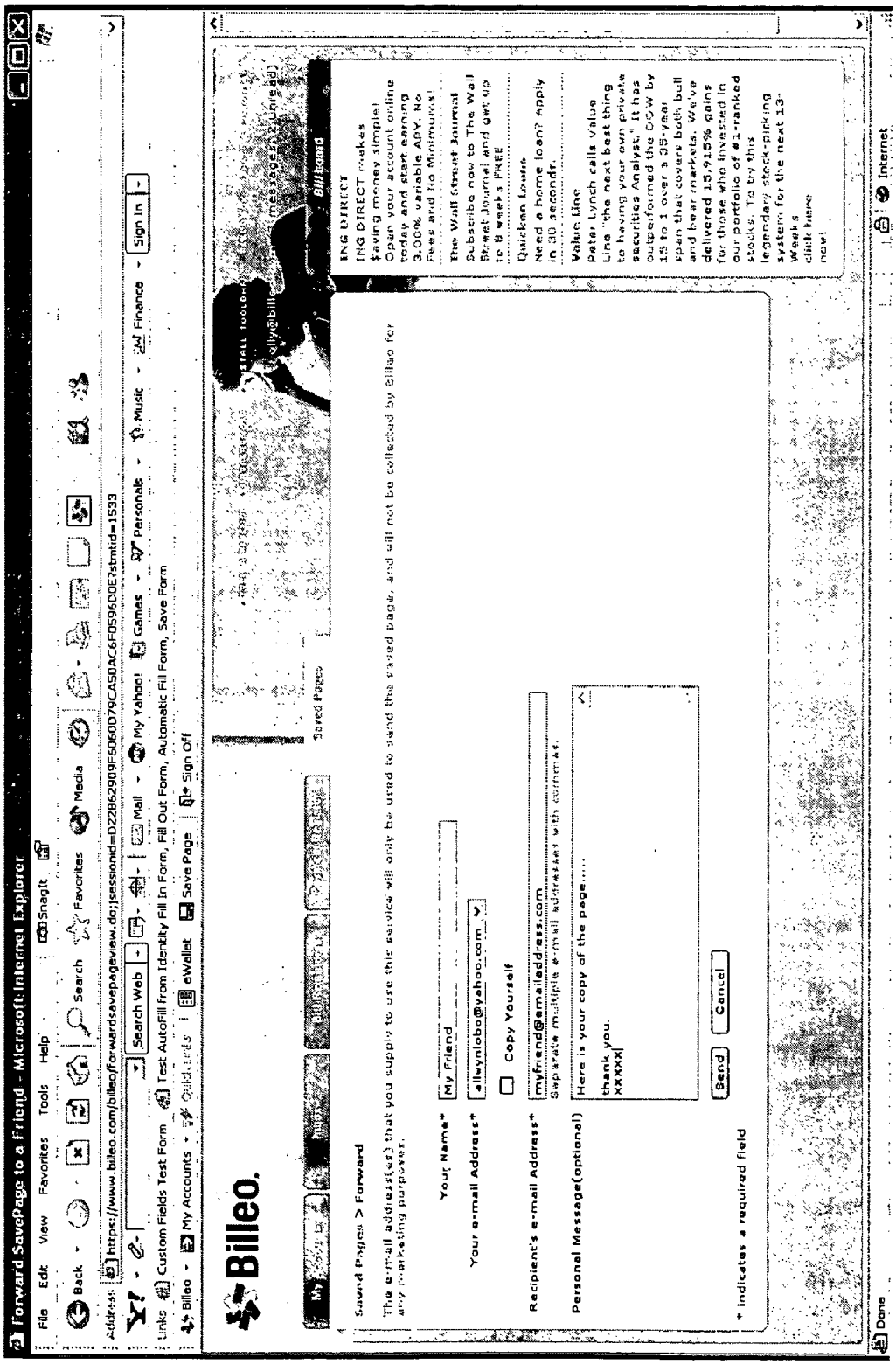
FIG. 13 is a view of the display when a user makes a selection to share a stored web page, in accordance with an embodiment of the invention.

FIG. 13 is a view of the display when the user makes a selection to share a stored web page, in accordance with an embodiment of the invention. When the user clicks on the forward link provided in the summarized list, a window is displayed for forwarding web pages. In an embodiment of the invention, the window prompts the user to enter information such as the name of the user, the e-mail address of the user, the e-mail address of the recipient, and a message that the user wants to send with the stored page.

FIG. 14 is a view of the display when the user views the shared web page in MS Outlook™, in accordance with an embodiment of the invention. FIG. 14 shows that the stored web page is embedded in an HTML format.

FIG. 15 is a view of the display when the user views the shared web page in Gmail™, in accordance with an embodiment of the invention. The web page is embedded in the compose page of the Gmail™ account. FIG. 15 shows that a message is input along with the embedded web page that will be forwarded to a recipient.

Figure 16:
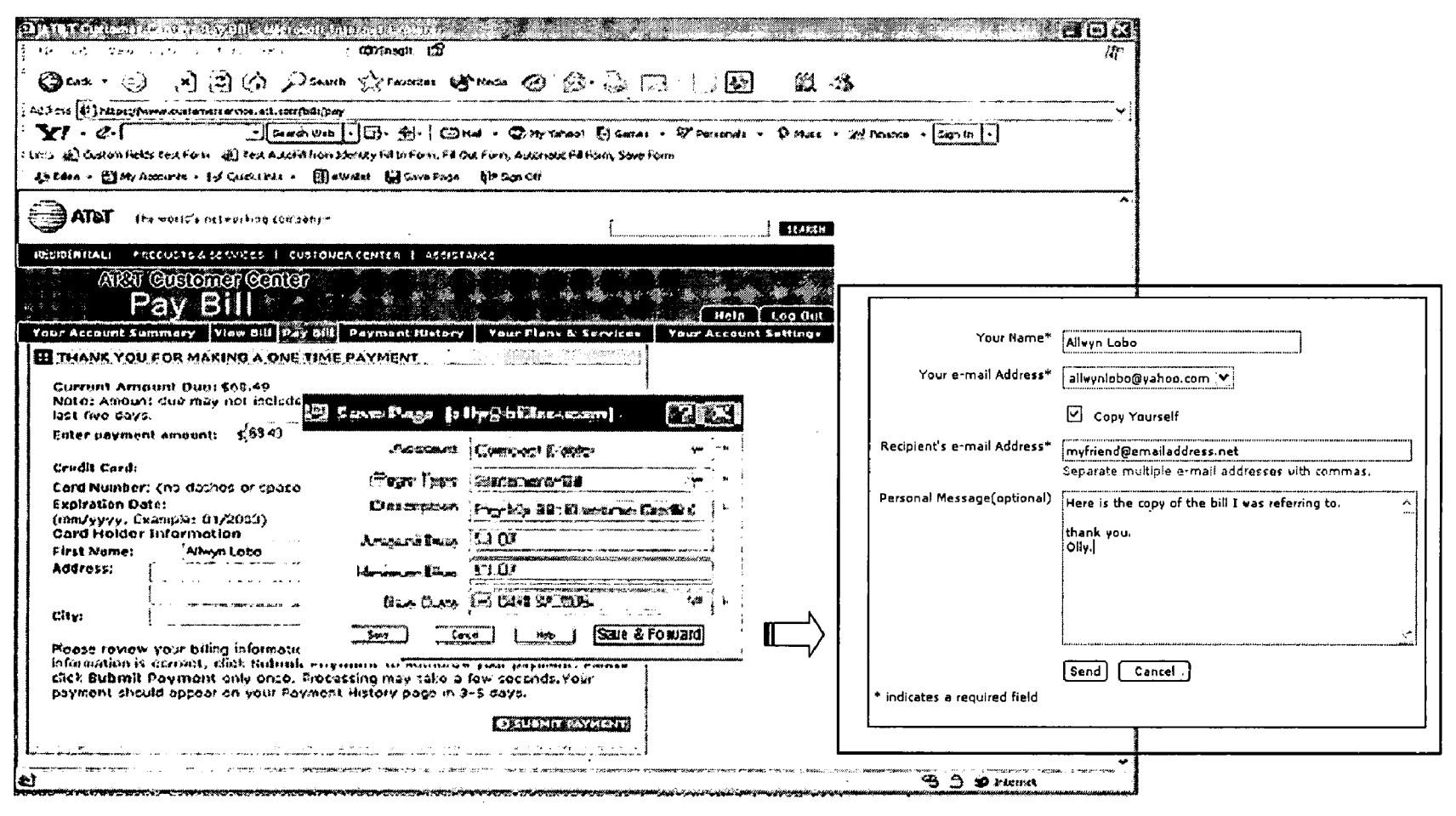

FIG. 16 is a view of the display when the user makes a selection to store and forward a web page, in accordance with an embodiment of the invention. When the user makes a selection to store and forward a web page, a window appears. The options provided in the window enable the user to enter the recipient's information and add a message, if any, to be sent along with the stored web page. The forward dialog box provides the user with options for sending or canceling the forwarding message.

Various embodiments of the invention enable the user to store web pages online for future reference. This is achieved by a system of storing the displayed web pages in a database on the network. The system stores the web pages in an organized manner.

Various embodiments of the invention enable the user to access the stored web pages at any time through the Internet. Further, the user can share the stored web pages with friends and associates. This is achieved by a system for extracting the stored web pages from the database through the Internet and displaying a list of stored web pages. The system allows the user to embed and attach the stored web pages in an electronic mail that can be sent to friends and associates.

Various embodiments of the invention offer the user the option of categorizing and searching for the stored web pages. This is achieved by a system that enables the user to select a category for a web page to be stored. Further, the system indexes the stored web pages by keywords enabling the user to search for the stored web pages.

Various embodiments of the invention also offer the user to store, organize and share valuable web pages such as statements, bills and payment confirmations via the Internet.

Various embodiments offer to store the information securely and restrict unauthorized access to the information. This is achieved by a system for validating authentication information input by the user prior to providing access to the user. This ensures that only an authenticated user can access the stored information. Further, the stored information is present in an encrypted form and needs to be decrypted.

The system for capturing, and sharing organizing, searching and sharing information, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/Output (I/O) interface, allowing the transfer as well as reception of data from other databases. The communication unit may include a modem, an Ethernet card, or any other similar device, which enables the computer system to connect to databases and networks, such as LAN, MAN, WAN and the Internet. The computer system facilitates inputs from a user through input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable instructions may include various commands that instruct the processing machine to perform specific tasks such as the steps that constitute the method of the present invention. The method and systems described can also be implemented using only software programming or using only hardware or by a varying combination of the two techniques. The present invention is independent of the programming language used and the operating system in the computers. The instructions for the invention can be written in all programming languages including, but not limited to 'C', 'C++', 'Visual C++' and 'Visual Basic'. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine. The invention can also be implemented in all operating systems and platforms including, but not limited to, 'Unix', 'DOS', and 'Linux'.

The programmable instructions can be stored and transmitted on computer readable medium. The programmable instructions can also be transmitted by data signals across a carrier wave. The present invention can also be embodied in a computer program product comprising a computer readable medium, the product capable of implementing the above methods and systems, or the numerous possible variations thereof.

While various embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computer-implemented method for recognizing, extracting and storing, without user input other than those of a financial transaction, one or more transaction attributes related to an online financial transaction being performed by a user on one or more websites using a browser plug-in, the method comprising:
   a. recognizing the steps of the online financial transaction being performed by the user on the one or more websites without user input other than those of the transaction, the recognizing being performed by the browser plug-in based on one or more actions performed on one or more web pages associated with the one or more websites;
   b. extracting the one or more transaction attributes from the one or more web pages associated with the one or more websites without user input, the extraction of the one or more transaction attributes being performed by the browser plug-in during the steps of the online financial transaction; and
   c. storing the one or more extracted transaction attributes along with a web page confirming the online financial transaction in a central repository located across a network after confirming completion of the online financial transaction without user input, the storing being performed based on one or more user preference settings.

2. The method of claim 1, wherein the one or more user preference settings comprises a Universal Resource Locator (URL) of the one or more websites for the online financial transaction.

3. The method of claim 1 further comprising:
   a. storing the one or more web pages associated with the one or more websites;
   b. time-stamping the one or more stored web pages without user input;
   c. securing the one or more stored web pages by encrypting the one or more stored web pages;
   d. categorizing the one or more stored web pages without user input, the categorization being performed based on the one or more transaction attributes extracted from the one or more web pages associated with the one or more websites;
   e. linking the one or more stored web pages without user input, the linking being performed based on the one or more transaction attributes extracted from the one or more web pages associated with the one or more websites;

f. displaying a list of the one or more stored web pages, the list comprising the one or more transaction attributes extracted from the one or more web pages associated with the one or more websites;

g. enabling the user to search for the one or more stored web pages based on one or more transaction attributes extracted from the one or more web pages associated with the one or more websites; and h. enabling the user to forward the one or more stored web pages to one or more recipients, the forwarding being performed by embedding the one or more stored web pages to be forwarded along with a message from the user in an electronic mail.

4. The method of claim 1, wherein the step of storing the one or more extracted transaction attributes further comprising:

a. displaying a window for storing to the user, the one or more extracted transaction attributes being displayed in the window for storing; and b. providing an option to the user for correcting the one or more extracted transaction attributes displayed in the window.

5. The method of claim 1, wherein the one or more transaction attributes comprises at least one of: type of one or more web pages associated with the one or more websites, payment amount, payment date, payment method, account category, description of the one or more web pages, and Universal Resource Locator (URL) of the one or more web pages.

6. A system for recognizing, extracting and storing one or more transaction attributes related to an online financial transaction being performed by a user on one or more websites, without user input other than those of the transaction, the system comprising:

a. a microprocessor;

b. a browser plug-in configured for interacting with the microprocessor for:

i. recognizing steps of the online financial transaction being performed by the user on the one or more websites without user input other than those of the transaction, wherein the recognizing is performed based on one or more actions performed on one or more web pages associated with the one or more websites;

ii. extracting the one or more transaction attributes from the one or more web pages associated with the one or more websites without user input, wherein the extraction of the one or more transaction attributes being performed during the steps of the online financial transaction; and iii. storing the one or more extracted transaction attributes along with a web page confirming the online financial transaction in a central repository located across a network, the storing being performed after recognizing a step of completion of the online financial transaction.

7. The system of claim 6, wherein the one or more user preference settings comprises a Universal Resource Locator (URL) of the one or more websites for the online financial transaction.

8. The system of claim 6, wherein the one or more transaction attributes comprises at least one of: type of one or more web pages associated with the one or more websites, payment amount, payment date, payment method, account category, description of the one or more web pages, and Universal Resource Locator (URL) of the one or more web pages.

* * * * *